W. P. SENG.
CIRCUIT CLOSER FOR MOTOR VEHICLE ELECTRIC HORNS.
APPLICATION FILED SEPT. 7, 1912.
1,134,356.
Patented Apr. 6, 1915.
2 SHEETS—SHEET 1.
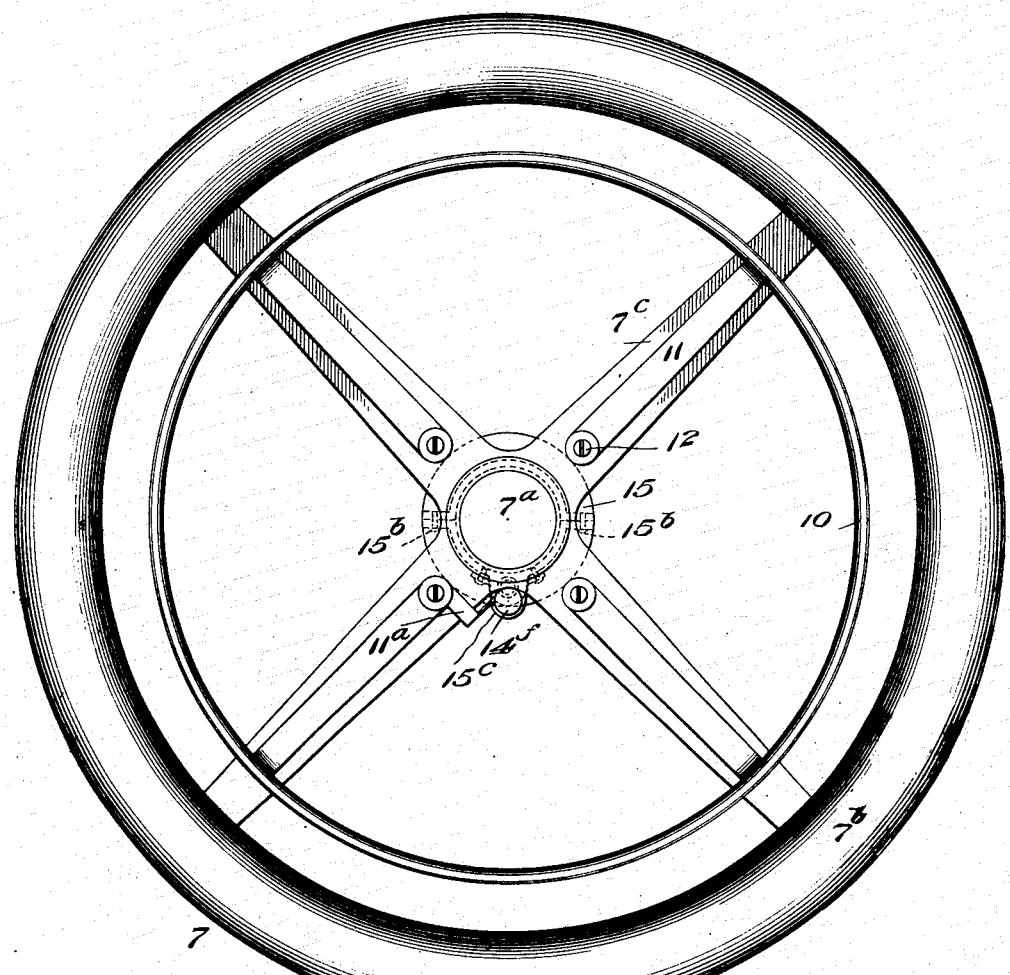
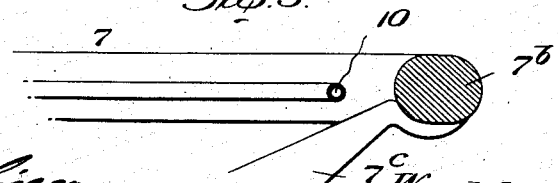

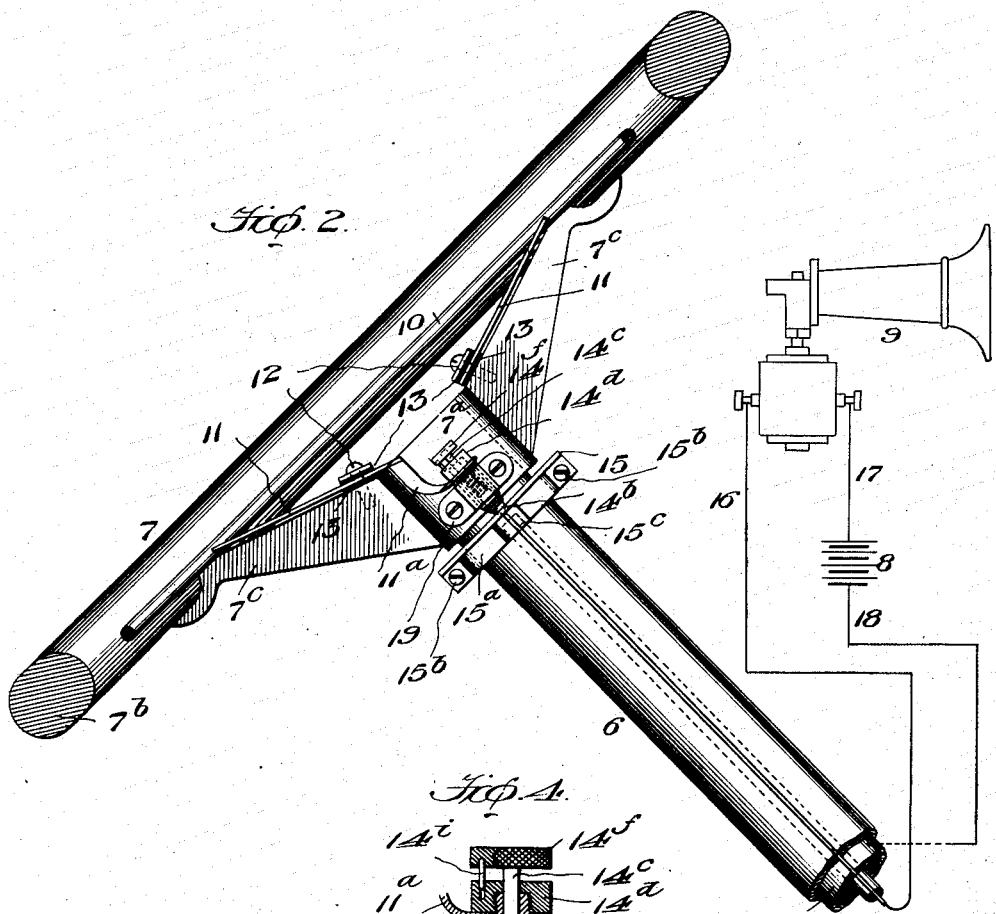
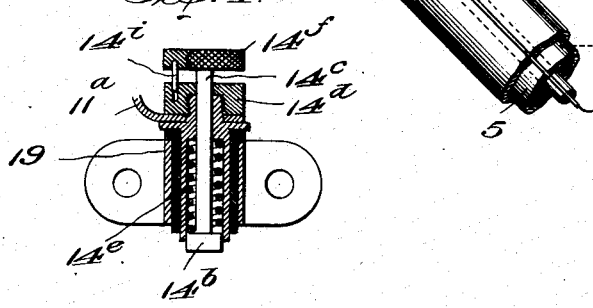

UNITED STATES PATENT OFFICE.

WENDELIN P. SENG, OF CHICAGO, ILLINOIS.

CIRCUIT-CLOSER FOR MOTOR-VEHICLE ELECTRIC HORNS.

1,134,356.  Specification of Letters Patent.  Patented Apr. 6, 1915.

Application filed September 7, 1912. Serial No. 719,244.

*To all whom it may concern:*

Be it known that I, WENDELIN P. SENG, a citizen of the United States, residing at Chicago, in the county of Cook and State of Illinois, have invented a Circuit-Closer for Motor-Vehicle Electric Horns, of which the following is a full and complete specification.

My invention relates to circuit-closing devices which are employed in connection with motor-vehicles for the purpose of controlling the circuits of electric-horns, bells, or other electrical devices, the present invention being a modification of the form of circuit closer shown and described in my companion application for patent, filed May 21, 1912, Serial No. 698,823.

The present arrangement, shown in the accompanying drawings and hereinafter described, is especially adapted for use in connection with that particular form of steering-mechanism for motor-vehicles in which the steering-post — carrying the hand-wheel — is rotatably mounted in a stationary sleeve or hollow standard; and contemplates suitable means for maintaining an electric connection between conductors carried by the fixed standard and movable wheel, respectively; said means in the present instance providing, also, for disconnecting or breaking the circuit at this point, so that the horn or other electric device will not be operated should anyone tamper with the circuit-closer.

The present invention consists in the construction and arrangement of parts, hereinafter described, and what I now claim as new, and desire to protect by Letters-Patent, is set forth in the appended claims.

In the accompanying drawings: Figure 1 is a plan view illustrating a circuit closing device in accordance with my present invention. Fig. 2 is a side elevation, partly in section, and illustrating an electric-horn and its connections, the latter being shown diagrammatically. Fig. 3 is a detail sectional view, to illustrate the relative position of the contact members of the circuit-closer. Fig. 4 is an enlarged detail sectional view of the means for connecting the conductors on the movable hand-wheel and fixed standard, respectively.

Like numerals of reference indicate like parts in all the figures of the drawings.

My improved circuit-closing devices are applied in the present instance to that conventional form of steering apparatus in which the steering-post 5 is rotatably mounted in a stationary sleeve or hollow standard 6, and has attached to its upper end the usual steering-wheel 7, the latter comprising a hub $7^a$, rim $7^b$, and spokes $7^c$ connecting the rim and hub. Also, as shown in the drawings, the electric circuit from the battery 8, through the intervention of the conductors and circuit-closer, hereinafter described, operates an electric-horn 9, of any approved type, but it will be understood, of course, that the circuit may be used to operate any other electric device.

In carrying out my invention I employ a circuit-closer comprising preferably an annular contact-member 10, adapted to co-act with the spokes of the steering-wheel 7, so that any one of said spokes may constitute the other contact-member, and these contact-members are electrically connected, respectively, to the opposite poles of the battery, the horn being suitably arranged in the circuit. The annular contact-member or ring 10 is disposed above the spokes $7^c$ and normally out of contact therewith, being yieldingly supported by a series of flat springs 11, corresponding in number with and insulatingly attached to said spokes near their inner ends. The flat springs are attached to the spokes preferably by screws 12 and insulating blocks or washers 13, and by reference to Fig. 1 it will be noted that the contact-member or ring is of somewhat less diameter than the rim of the steering-wheel, so that said rim may be grasped and turned without touching the contact-member or ring, the operation of the latter being effected, when desired, by the operator depressing the same with his thumbs, which overlap the rim, as will be understood.

The annular contact-member or ring 10 is electrically connected to a conductor 14, carried on the hub of the steering-wheel 7, and in traveling contact with an annular plate 15 insulatingly attached to the upper end of the stationary sleeve or standard 6, said plate being connected to one pole of the battery by wire 16, horn 9 and wire 17. The other pole of the battery is connected to a ground-wire 18, which in the present instance is connected to any part of the metal framework of the vehicle that will serve to conduct the current into the spokes of the steering-wheel—in the drawings being shown connected directly to the steering-post 5, for convenience in following the circuit.

The annular contact-member or ring 10 is electrically connected to the conductor 14 by an extension 11ª of one of the metal springs 11, and the conductor comprises a sleeve 14ª, and a presser-foot 14ᵇ working in the lower end of the sleeve and having a shank 14ᶜ projecting through and above the upper end of the sleeve, the latter having a milled nut 14ᵈ threaded on the upper end thereof to bear against the connecting-plate 11ª, and an interposed and inclosed spring 14ᵉ serves to press the foot against the annular plate 15. The sleeve is supported on the hub of the steering-wheel by a bracket 19, from which it is suitably insulated, and in the present instance the projecting end of the shank 14ᶜ of the presser-foot is provided with a milled head 14ᶠ having an inwardly projecting pin 14ⁱ adapted to work in a corresponding aperture in the milled nut 14ᵈ and permit the presser-foot to ride on the aforementioned plate 15, and thereby electrically connect the annular contact-member or ring 10 to the battery, as hereinbefore explained. When it is desired to temporarily break the circuit for any reason, for instance to prevent operation of the horn by anyone tampering with the contact-member or ring, it is only necessary to lift the head 14ᶠ until the pin 14ⁱ leaves the aperture or hole and turn said head until the pin is out of alinement with said hole and bears against the milled nut, thus moving the presser-foot 14ᵇ out of contact with the plate 15 and holding it in this position.

The plate 15 which is fastened on the upper end of the hollow standard 6 is in two parts having depending attaching flanges 15ª, by which said parts are clamped on the standard by bolts 15ᵇ, suitable insulating material being interposed between the two-part plate and standard, and the attaching flange of one of the parts of the plate is provided with a boss 15ᶜ, to which the wire 16 from the electric-horn is suitably connected. The operation of the device will be readily understood by reference to the drawings, for in sounding the horn it is only necessary to press the annular contact-member or ring 10 downward into contact with one or more of the spokes of the steering-wheel, thus closing the circuit, which will then be from the positive pole of the battery by wire 17, horn 9, wire 16, plate 15, conductor 14, and spring plate 11ª—11 to contact member 10, and through spokes of steering-wheel, the steering-post 5 and wire 18 to negative pole of battery. When pressure on the annular contact-member or ring is released the supporting springs 11 will move said contact-member or ring away from the spokes, so that the circuit will be held normally open at this point.

It will be noted that the contact-member or ring 10 is so located as not to interfere with the ordinary operation of the wheel in steering, and inasmuch as it follows the rim around its entire inner circumference said contact-member or ring may be manipulated at any point at which the hand or hands of the operator may be located on the rim of the steering-wheel. Furthermore, the conductor 14 and plate 15 provide for maintaining an electric connection between the movable steering-wheel and stationary standard irrespective of the position to which the wheel may be turned.

It will be understood, of course, that though I have shown and described the spokes or spoke of the steering-wheel as constituting one of the contact-members of the circuit-closer a supplemental contact-member could be employed and suitably wired to the negative pole of the battery.

Having described my invention, I claim:

1. In combination with a steering mechanism for motor-vehicles comprising a stationary element and a circularly movable element, of an electric circuit including a substantially annular contact-member disposed in close relation to and surrounding the axis of the movable element and adapted to complete the circuit through the same, and electric conductors on the aforesaid movable and stationary elements, respectively, and normally in movable contact one with the other, the conductor on the movable element being electrically-connected to the aforesaid contact-member.

2. In combination with a steering mechanism for motor-vehicles comprising a stationary element and a movable steering-wheel, of an electric circuit having a substantially annular contact-member disposed in close relation to the steering-wheel and adapted to complete the circuit through said wheel, an annular plate insulatingly attached to the stationary element, and a presser-foot insulatingly supported by the movable steering wheel to travel over and in contact with the plate and electrically connected to the contact member, said presser-foot and plate being included in the circuit.

3. In combination with a steering mechanism for motor-vehicles, comprising a stationary element and a movable steering-wheel, of an electric signal circuit and circuit closer including a substantially annular contact-member disposed in close relation to the steering-wheel and adapted to complete the circuit through said wheel, an annular plate insulatingly attached to the stationary element, and a conductor carried by the steering wheel and comprising a sleeve insulatingly attached to said steering wheel, a nut threaded on the upper end of the sleeve, a spring-actuated presser-foot having a shank extending through and beyond the end of the sleeve, and a head on the end of the shank having a pin adapted to take into a hole in the aforesaid nut to permit the presser-foot to slidably engage the plate, said presser-foot being electrically connected to the aforesaid contact member.

4. In combination with a steering mechanism for motor-vehicles, comprising a stationary element and a movable steering-wheel, of an electric signal circuit and circuit-closer having a substantially annular contact-member disposed in close relation to the steering-wheel and adapted to complete the circuit through the same, and a series of springs extending from the annular contact-member and insulatingly attached to the steering-wheel, one of said springs having an extension forming an electric connection; together with an annular plate insulatingly attached to the stationary element, and a conductor carried by the movable steering-wheel and comprising a sleeve insulatingly attached thereto and adapted to receive the spring extension or connection, a nut threaded on the end of the sleeve against said extension or connection, a spring-actuated presser-foot having a shank extending through and beyond the nut, and a head on the end of the shank having a pin adapted to take into a hole in said nut and permit the presser-foot to slidably engage the plate.

In testimony whereof I have signed my name to this specification in the presence of two subscribing witnesses.

WENDELIN P. SENG.

Witnesses:
FRANK J. SENG,
JOHN M. BROST.